(12) United States Patent
Takatani

(10) Patent No.: US 10,447,878 B2
(45) Date of Patent: Oct. 15, 2019

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Tamotsu Takatani, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/759,816

(22) Filed: Feb. 5, 2013

(65) Prior Publication Data

US 2013/0201512 A1 Aug. 8, 2013

(30) Foreign Application Priority Data

Feb. 6, 2012 (JP) .................. 2012-022837

(51) Int. Cl.
*H04N 1/00* (2006.01)
*G03G 15/00* (2006.01)

(52) U.S. Cl.
CPC ..... *H04N 1/00891* (2013.01); *G03G 15/5004* (2013.01)

(58) Field of Classification Search
CPC .. G03G 15/5004; G03G 15/5012; G06F 1/32; G06F 1/3203; G06F 1/3206; G06F 1/3209; G06F 1/3228; H04N 1/00891; H04N 1/00896

See application file for complete search history.

(56) References Cited

U.S. PATENT DOCUMENTS

| 2006/0007469 | A1* | 1/2006 | Uruma | H04N 1/0035 358/1.14 |
| 2006/0028661 | A1* | 2/2006 | Uruma | H04N 1/00408 358/1.6 |
| 2006/0200704 | A1* | 9/2006 | Takahashi et al. | 714/38 |
| 2007/0240159 | A1* | 10/2007 | Sugiyama | H04N 1/00885 718/102 |
| 2008/0232840 | A1* | 9/2008 | Ebihara | G03G 15/553 399/79 |

(Continued)

FOREIGN PATENT DOCUMENTS

| CN | 1929534 A | 3/2007 |
| CN | 101989123 A | 3/2011 |

(Continued)

*Primary Examiner* — Frantz Bataille
(74) *Attorney, Agent, or Firm* — Canon USA, Inc., IP Division

(57) ABSTRACT

An image forming apparatus includes a first reception unit configured to receive a first type job via a network, a second reception unit configured to receive a second type job generated based on a user's operation received by an operation unit of the image forming apparatus, a setting unit configured to set a time at which shutdown processing for turning off the image forming apparatus is to be performed, and a control unit configured to, in a case where there is the first type job when the time set by the setting unit is reached, perform the shutdown processing without executing the first type job, and to, in a case where there is the second type job when the time set by the setting unit is reached, perform the shutdown processing with executing the second type job.

26 Claims, 5 Drawing Sheets

(56) References Cited

U.S. PATENT DOCUMENTS

| | | | | |
|---|---|---|---|---|
| 2011/0222101 A1* | 9/2011 | Nakamura | ......... | G03G 15/5004 358/1.14 |
| 2011/0317207 A1* | 12/2011 | Shimizu | .................... | G06F 1/20 358/1.15 |
| 2013/0096730 A1* | 4/2013 | Numata | ................. | G06K 15/40 700/297 |

FOREIGN PATENT DOCUMENTS

| | | |
|---|---|---|
| CN | 102314324 A | 1/2012 |
| EP | 0926568 A1 | 6/1999 |
| JP | 2006024016 A | 1/2006 |
| JP | 2011-084073 A | 4/2011 |

\* cited by examiner

IMAGE FORMING APPARATUS, METHOD FOR CONTROLLING IMAGE FORMING APPARATUS, AND STORAGE MEDIUM

BACKGROUND OF THE INVENTION

Field of the Invention

The present invention relates to an image forming apparatus and a method for controlling an image forming apparatus, which can automatically turn off the image forming apparatus.

Description of the Related Art

In recent years, with the enhancement of awareness about power consumption, power saving functions have been realized even at image forming apparatuses. As one function among them, there is a function of automatically turning off an image forming apparatus at a time specified for each day of the week (hereinafter referred to as a "weekly shutdown function").

The weekly shutdown function is such a function that, for example, a user sets a time for each day of the week, like 21 o'clock for Monday, 20 o'clock for Tuesday, and 17 o'clock for Wednesday, and the image forming apparatus is turned off at the specified time for each day of the week. This function is expected to be mainly used for the purpose of reducing wasteful power consumption in a time zone where nobody will use the image forming apparatus at an office after business hours.

As described above, according to the weekly shutdown function, a time of turning off an image forming apparatus is specified in advance. However, one possible situation to occur is that an operator may not know the specified time, and may be operating the image forming apparatus when the specified time is reached. A problem with the weekly shutdown function is that, if the image forming apparatus is turned off while being operated, for example, paper maybe being just conveyed at this moment so that a jam may occur, or read data may be unable to be stored in a non-volatile device and therefore be lost.

In consideration of these circumstances, Japanese Patent Application Laid-Open No. 2011-084073 discusses a technique for turning off an apparatus after all jobs in the apparatus are carried out. However, this conventional technique has the following problem. If the apparatus receives a large number of jobs immediately before a specified time for a weekly shutdown, the apparatus is not shut down until execution of all jobs is completed. Therefore, if it takes a long time to carry out the jobs, this may result in a delay of shutdown largely past the specified time.

SUMMARY OF THE INVENTION

The present invention is directed to a mechanism capable of safely turning off an image forming apparatus even if the image forming apparatus is being operated at a shutdown set time, and also of preventing occurrence of such a situation that the image forming apparatus cannot be turned off despite being largely past the set time.

According to an aspect of the present invention, a first reception unit configured to receive a first type job via a network, a second reception unit configured to receive a second type job generated based on a user's operation received by an operation unit of the image forming apparatus, a setting unit configured to set a time at which shutdown processing for turning off the image forming apparatus is to be performed, and a control unit configured to, in a case where there is the first type job received by the first reception unit when the time set by the setting unit is reached, perform the shutdown processing without executing the first type job, and to, in a case where there is the second type job received by the second reception unit when the time set by the setting unit is reached, perform the shutdown processing with executing the second type job.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings. However, constituent components described in the description of these exemplary embodiments are intended for only illustrative purposes, and should not be construed as a limitation on the scope of the present invention.

In the following description, an image forming apparatus will be described as an exemplary embodiment of an information processing apparatus according to the present invention.

Figure 1:
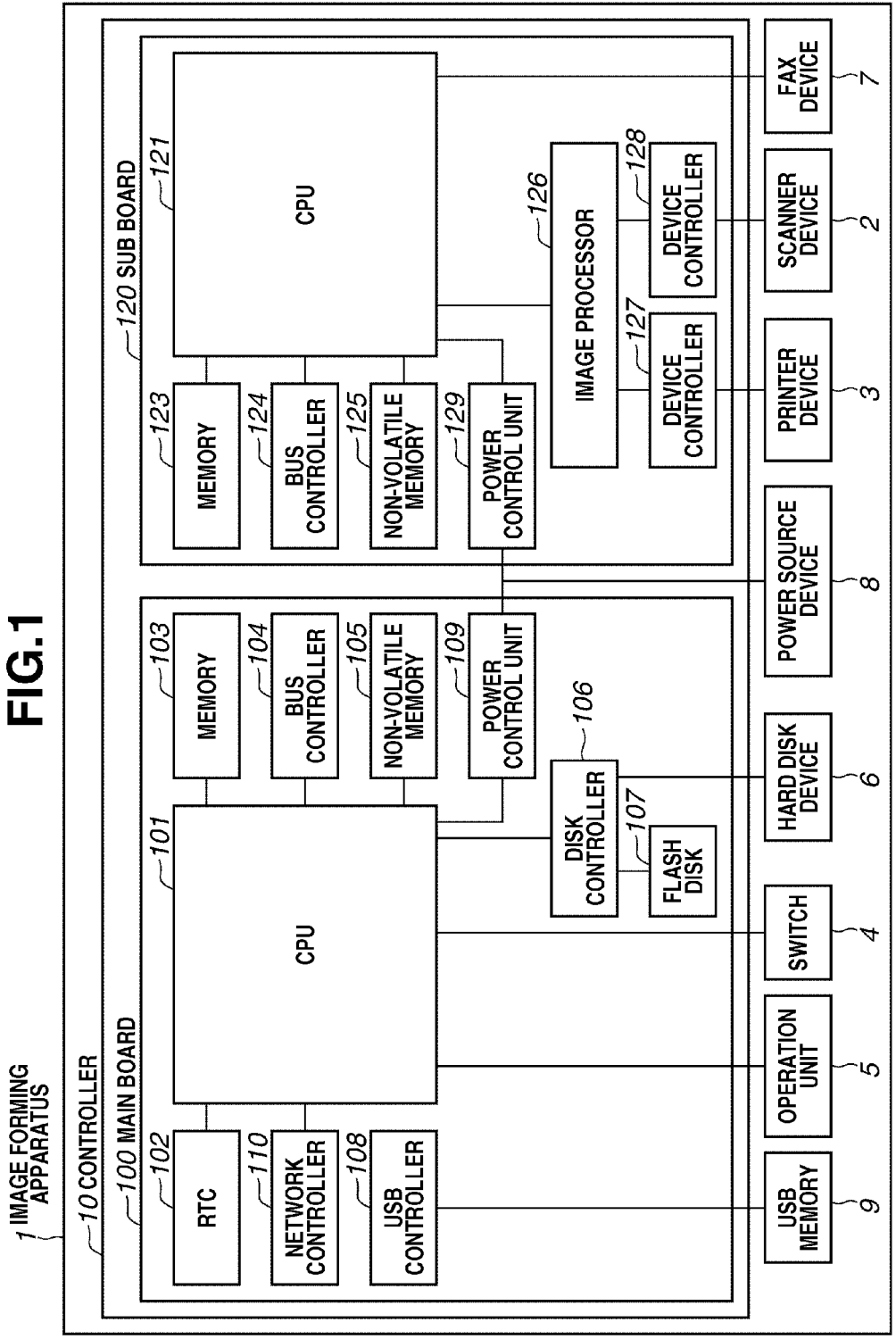
FIG. 1 is a block diagram illustrating an example of a configuration of an image forming apparatus as an exemplary embodiment of an information processing apparatus according to the present invention.

FIG. 1 is a block diagram illustrating an example of a configuration of the image forming apparatus as the exemplary embodiment of the information processing apparatus according to the present invention.

FIG. 1 illustrates an image forming apparatus 1 according to the present exemplary embodiment. The image forming apparatus 1 includes a controller 10, a universal serial bus (USB) memory 9, an operation unit 5, a switch 4, a hard disk device 6, a power source device 8, a printer device 3, a scanner device 2, and a facsimile (FAX) device 7.

In the following description, the controller 10, which is a module to which the present invention is employed specifically, will be described. The controller 10 includes a main board 100 and a sub board 120.

The main board 100 is a so-called general-purpose central processing unit (CPU) system. The main board 100 includes, for example, a CPU 101, a real time clock (RTC) 102, a memory 103, a bus controller 104, a non-volatile memory 105, a network controller 110, a disk controller 106, a flash disk 107, and a USB controller 108.

The CPU 101 controls the entire main board 100. The RTC 102 measures a time. The RTC 102 operates by receiving power supply from an external power source when power is supplied from the external power source, and operates by receiving power supply from an internal battery when the power supply stops from the external power source.

The memory 103 is a volatile memory that the CPU 101 uses as a work memory. The bus controller 104 has a bridge function of mediating an exchange with an external bus. The non-volatile memory 105 is a storage device capable of holding data even when a power supply stops. The network controller 110 controls access to an external network such as a local area network (LAN).

The disk controller 106 controls a storage device such as the hard disk device 6. The flash disk 107 is, for example, a solid state drive (SSD), and is a relatively low-capacity storage device constituted by a semiconductor device. The USB controller 108 controls communication with a USB device.

The USB memory 9, the operation unit 5, and the hard disk device 6 are externally connected to the main board 100. The hard disk device 6 does not necessarily have to be a hard disk, and may be embodied by any type of storage device as long as the storage device is a non-volatile device.

The sub board 120 includes, for example, a relatively small general-purpose CPU system and image processing hardware. The sub board 120 includes, for example, a CPU 121, a memory 123, a bus controller 124, a non-volatile memory 125, an image processor 126, a device controller 127, and a device controller 128.

The CPU 121 controls the entire sub board 120. The memory 123 is a volatile memory that the CPU 121 uses as a work memory. The bus controller 124 has a bridge function of mediating an exchange with an external bus. The non-volatile memory 125 is a storage device capable of holding data even when power supply stops.

The image processor 126 performs real-time digital image processing. The device controller 127 transfers digital image data between the image processor 126 and the printer device 3. The device controller 128 transfers digital image data between the image processor 126 and the scanner device 2. The FAX device 7 is directly controlled by the CPU 121.

A power source of the main board 100 and the sub board 120 is the power source device 8, from which power is supplied to the main board 100 and the sub board 120. The power control unit 109 manages power supply to the respective units on the main board 100 that require power. The power control unit 129 manages power supply to the respective units on the sub board 120 that require power.

The power source switch 4 receives a user's operation for tuning off and on the image forming apparatus 1, and an interruption is issued to the CPU 101 when the power source switch 4 is operated. Upon detection of the interruption, the CPU 101 controls the power control unit 109 according to a state of the image forming apparatus 1. Further, the CPU 121 detects an operation of the power source switch 4 via, for example, the bus controller 124, and controls the power control unit 129.

FIG. 1 is a block diagram, and its illustration is schematic. For example, the CPU 101 and the CPU 121 include a large number of CPU peripheral hardware devices such as a chip set, a bus bridge, and a clock generator. However, they are not necessary for the description of the present exemplary embodiment, and therefore are omitted from the illustration for a simplification purpose. It should be understood that the block configuration illustrated in FIG. 1 does not limit the present invention.

In the following description, an operation of the controller 10 will be described based on an example of an image copying operation using a paper device.

When the user instructs the image forming apparatus 1 to copy an image from the operation unit 5, the CPU 101 transmits an image reading command to the scanner device 2 via the CPU 121. The scanner device 2 optically scans a document set on the scanner device 2, converts an image on the document into digital image data, and inputs the digital image data to the image processor 126 via the device controller 128.

The image processor 126 temporarily stores the digital image data by performing direct memory access (DMA) transfer to the memory 123 via the CPU 121.

After the CPU 101 can confirm that the digital image data is stored in the memory 123 by a predetermined amount or entirely, the CPU 101 issues an image output instruction to the printer device 3 via the CPU 121. The CPU 121 notifies the image processor 126 of a location in the memory 123 where the image data is stored.

The image processor 126 transmits the image data in the memory 123 to the printer device 3 via the device controller 127 according to a synchronization signal from the printer device 3.

The printer device 3 prints the digital image data input via the device controller 127 on a paper device.

For printing a plurality of copies, the CPU 101 stores the image data in the memory 123 into the hard disk device 6, and transmits the image data stored in the hard disk device 6 to the printer device 3 without inputting the image data from the scanner device 2 for the second copy and the subsequent copies.

The image forming apparatus 1 has a function of automatically turning off the image forming apparatus 1 at a specified time for each day of the week (the weekly shutdown function). The weekly shutdown function is such a function that, for example, the user sets a shutdown time for each day of the week, like 21 o'clock for Monday, 20 o'clock for Tuesday, and 17 o'clock for Wednesday, and the image forming apparatus 1 is turned off at the shutdown set time for each day of the week.

In the following description, an operation for setting a shutdown time of the weekly shutdown function will be described.

When the user instructs the image forming apparatus 1 to start setting a shutdown time from the operation unit 5, the operation unit 5 notifies the CPU 101 of this operation, and the CPU 101 displays a setting screen for setting a shutdown time on a display unit of the operation unit 5.

Then, when the user sets a shutdown time from the setting screen, the operation unit 5 notifies the CPU 101 of this operation, and the CPU 101 stores the shutdown time set by the user (a shutdown set time) into the non-volatile memory 105 (this storage destination may be the hard disk device 6 or the flash disk 107). As the shutdown set time, a different time may be set for each day of the week, or a same time may be set for all days of the week.

In the following description, power supply states of the respective units, when the image forming apparatus 1 is in a standby state, a sleep state, and a shutdown state, will be described.

Figure 5:
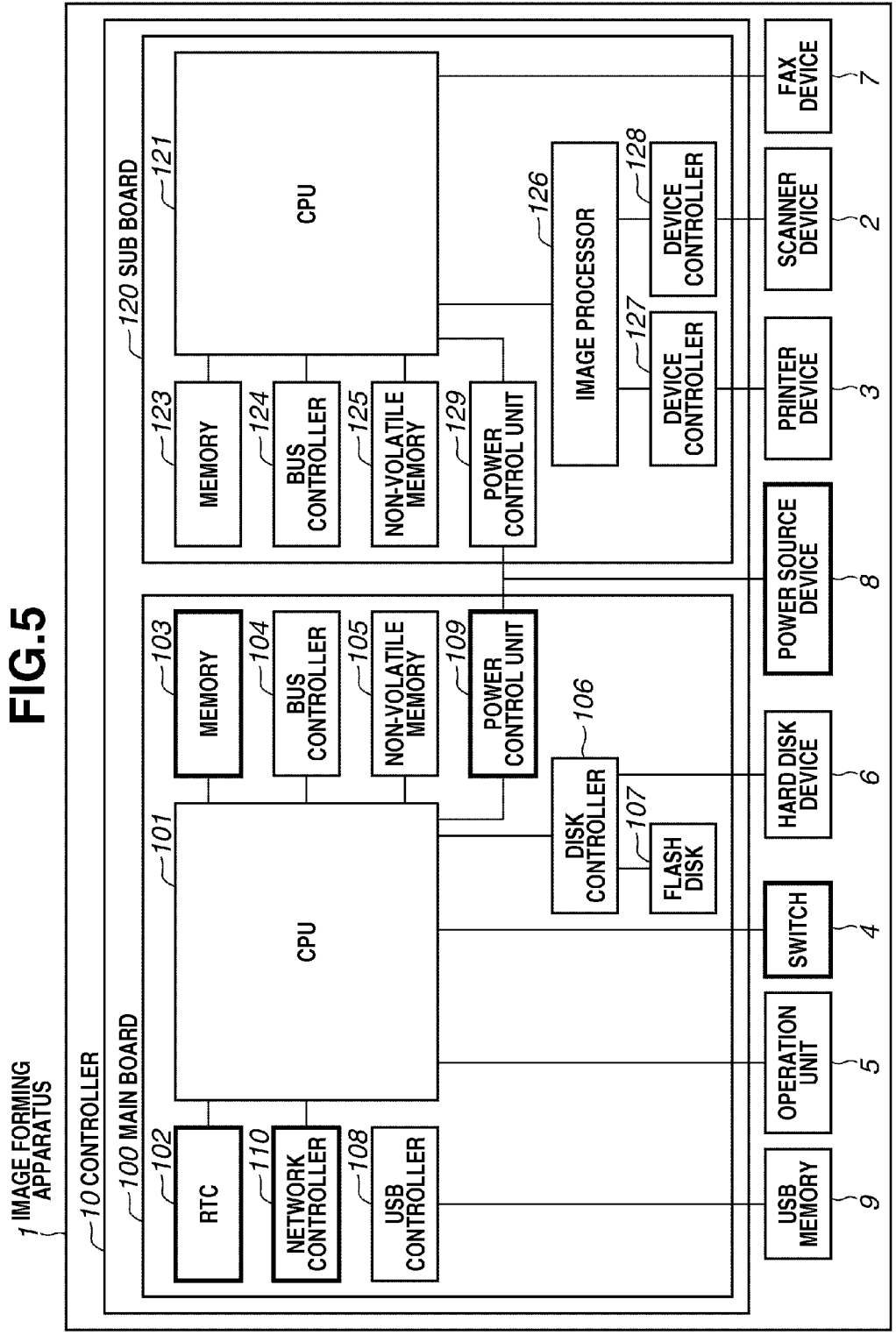
FIG. 5 illustrates power supply states of respective units when the image forming apparatus is in a sleep state.

FIG. 5 illustrates power supply states of the respective units when the image forming apparatus 1 is in the sleep state. When the image forming apparatus 1 is in the standby state, power is supplied to all units of the image forming apparatus 1.

When a predetermined condition is satisfied, for example, when a predetermined time period has elapsed from completion of a last operation from the operation unit 5 or execution of a last job from the network, the image forming apparatus 1 shifts to the sleep state (a power saving state).

In the sleep state, as indicated by thick-bordered boxes in FIG. 5, power is supplied only to the power source device 8, the RTC 102, the memory 103, the power control unit 109, the network controller 110, and the switch 4, while power is not supplied to the other units.

In the shutdown state, power is supplied only to the RTC 102 from the internal battery, and power is not supplied to the other units.

In the following description, a power saving control operation of the controller 10 using a shutdown set time will be described with reference to FIG. 2.

Figure 2:
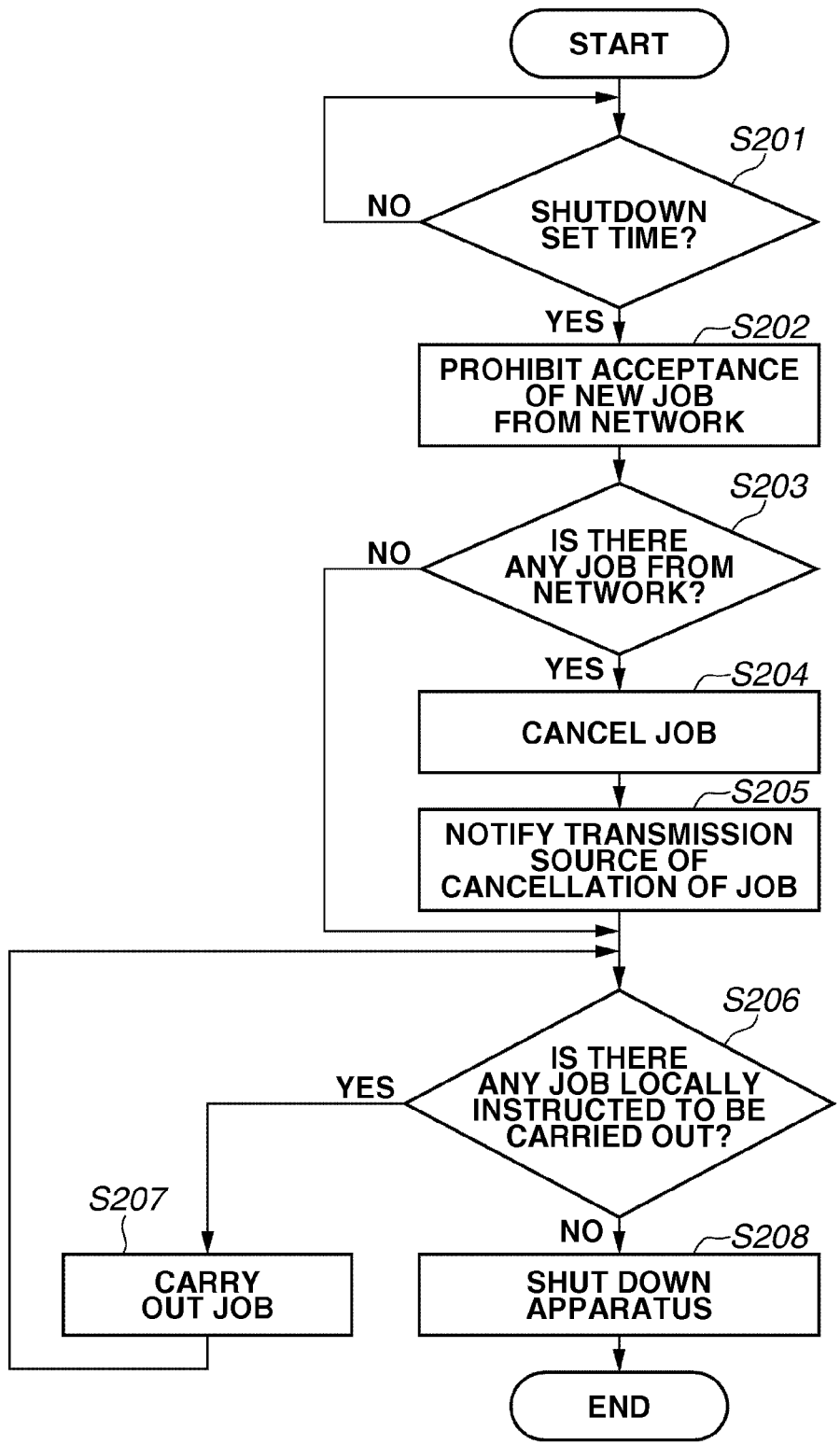
FIG. 2 is a flowchart illustrating an example of a power saving control operation of a controller according to a first exemplary embodiment.

FIG. 2 is a flowchart illustrating an example of the power saving control operation (set time shutdown processing) of the controller 10 according to a first exemplary embodiment. The CPU 101 of the controller 10 executes a program stored in the hard disk device 6 or the flash disk 107 in a computer readable manner, by which the present flowchart is realized.

In step S201, the CPU 101 acquires a current time from the RTC 102, and determines whether a preset shutdown set time is reached. The shutdown set time is a shutdown set time corresponding to today's day of the week, which the CPU 101 acquires from the non-volatile memory 105.

Then, if the CPU 101 determines that the shutdown set time is not yet reached (NO in step S201), in step S201, the CPU 101 continues monitoring the shutdown set time.

On the other hand, if the CPU 101 determines that the shutdown set time is reached (YES in step S201), the CPU 101 advances the processing to step S202.

In step S202, the CPU 101 performs control so as not to receive anew job from the network via the network controller 110 (in other words, prohibits reception of a new job from the network via the network controller 110), and then advances the processing to step S203.

In a case where the CPU 101 prohibits reception of a new job, the CPU 101 notifies a host machine that is a transmission source of the new job of a message such as "any new print job cannot be received since the shutdown set time has been reached". The CPU 101 continues allowing reception of a new job from the operation unit 5.

In step S203, the CPU 101 determines whether there is a job received from the network controller 110. Each job to be carried out by the image forming apparatus 1 has a flag for identifying the type of the job assigned thereto, and the CPU 101 can determine whether the job is a job received from the network controller 110 by referring to this flag.

Then, if the CPU 101 determines that there is no job received from the network controller 110 (NO instep S203), the CPU 101 directly advances the processing to step S206.

On the other hand, if the CPU 101 determines that there is a job received from the network controller 110 (YES in step S203), the CPU 101 advances the processing to step S204.

In step S204, in a case where a job (a job from the network) before being transmitted to the printer device 3 via the device controller 127 is spooled in the memory 103, the CPU 101 cancels that job, and advances the processing to step S205.

In step S205, the CPU 101 notifies, via the network controller 110, the host machine, which is a transmission source of the above-described canceled job, that the job is canceled.

For example, the CPU 101 transmits a message saying "a job of printing "xxx.doc" is cancelled since the shutdown set time has been reached". Then, the CPU 101 advances the processing to step S206.

In step S206, the CPU 101 determines whether there is a job locally instructed to be carried out. The "job locally instructed to be carried out" means a job that an operator instructs the image forming apparatus 1 to carry out using the operation unit 5.

Then, if the CPU 101 determines that there is a job locally instructed to be carried out (YES in step S206), the CPU 101 advances the processing to step S207.

In step S207, the CPU 101 carries out the job locally instructed to be carried out, and returns the processing to step S206.

On the other hand, if there is no job locally instructed to be carried out (NO in step S206), the CPU 101 advances the processing to step S208.

In step S208, the CPU 101 shuts down the image forming apparatus 1. In other words, the CPU 101 turns off the image forming apparatus 1 with use of the power control unit 109.

The image forming apparatus 1 according to the present exemplary embodiment is configured in such a manner that, when the shutdown set time is reached, if there is a job received via the network, this job is canceled, and if there is a job received via an operation from the operation unit 5, this job is carried out, and after that, the image forming apparatus 1 is shut down. Further, the image forming apparatus 1 is also configured in such a manner that, if the job received via the network is canceled, a notification indicating that the job is canceled is transmitted to the transmission source of the job.

According to the above-described configuration, the present exemplary embodiment carries out all of jobs locally instructed to be carried out even when the current time has exceeded the specified time for weekly shutdown (the shutdown set time), whereby it is possible to prevent the image forming apparatus 1 from being automatically turned off while the operator is carrying out a job.

It is also possible to notify the operator that the current time has exceeded the shutdown set time via the operation unit 5, and to prompt the operator to end the operation.

Further, the present exemplary embodiment cancels a job from the network after the current time has exceeded the shutdown set time, whereby it is also possible to prevent occurrence of such a situation that the image forming apparatus 1 processes a large number of jobs even after the current time has exceeded the shutdown set time, and therefore cannot be turned off indefinitely, resulting in a delay of shutdown largely past the shutdown set time.

For the job from the network, it is possible to notify, via the printer driver, a computer terminal at a transmission source side that the job has been canceled. As a result, a transmitter can recognize that his/her job has been canceled, and therefore can output the job using another image forming apparatus.

Therefore, it is possible to safely turn off the image forming apparatus 1 by avoiding such a problem that, for example, paper is just being conveyed at this moment so that a jam occurs, or read data cannot be stored in the non-volatile memory and therefore is lost, even if the user is operating the image forming apparatus 1 from the operation unit 5 at the shutdown set time.

According to the above-described first exemplary embodiment, it is possible to guarantee completion of the job that the operator carries out locally. However, in a case where the operator is merely operating the screen without carrying out the job, the image forming apparatus 1 may be automatically turned off during the operation.

Therefore, a second exemplary embodiment will be described as a configuration capable of performing weekly shutdown while preventing the image forming apparatus 1 from being turned off when the operator is operating the screen.

In the following description, a content of processing according to the second exemplary embodiment will be specifically described with reference to FIG. 3.

Figure 3:
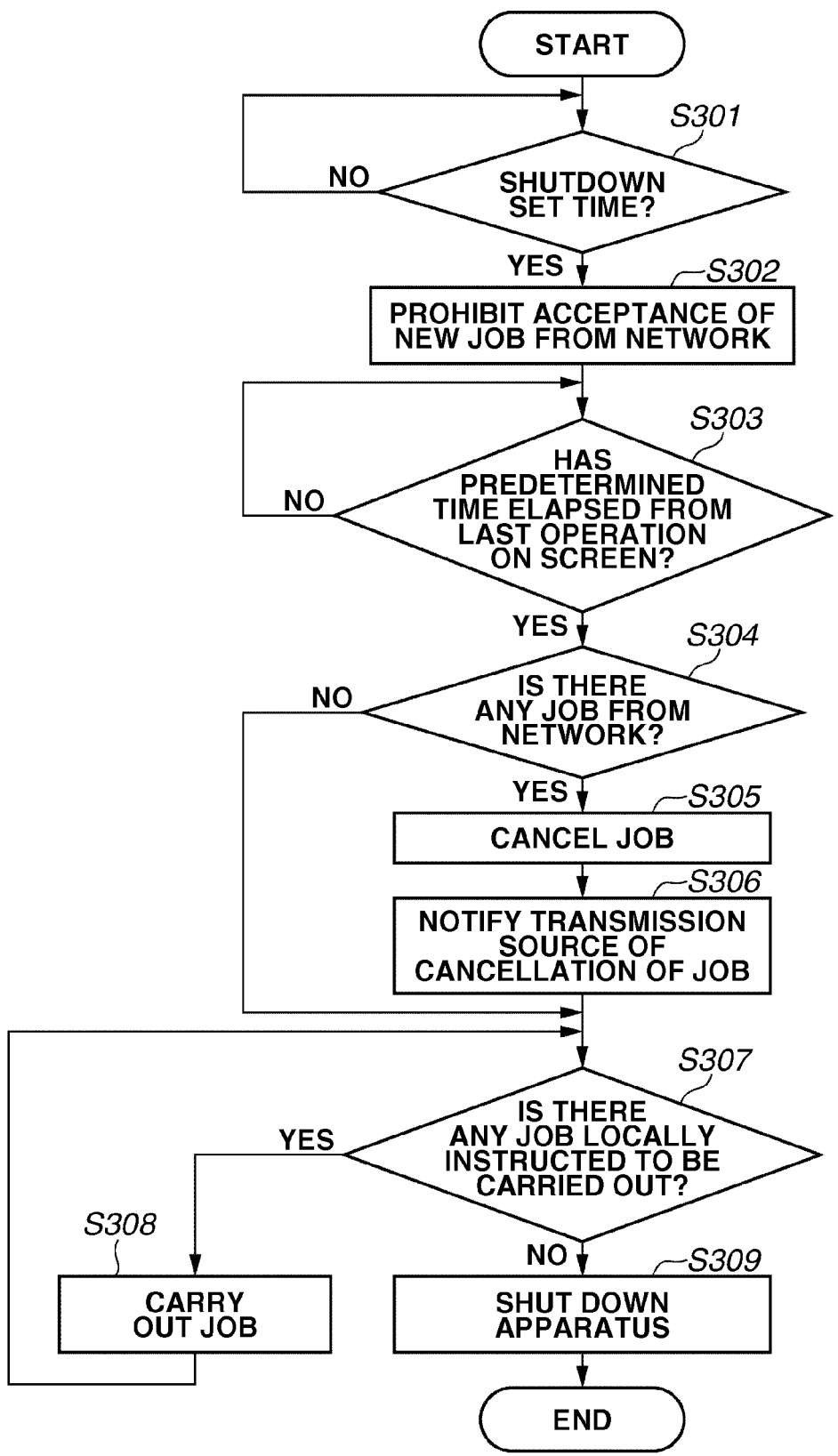
FIG. 3 is a flowchart illustrating an example of a power saving control operation of a controller according to a second exemplary embodiment.

FIG. 3 is a flowchart illustrating an example of a power saving control operation (set time shutdown processing) of the controller 10 according to the second exemplary embodiment. The CPU 101 of the controller 10 executes a program stored in the hard disk device 6 or the flash disk 107 in a computer readable manner, by which the present flowchart is realized.

Steps S301 and S302 are similar to steps S201 and S202 illustrated in FIG. 2, and therefore a description thereof will be omitted here.

In step S303, the CPU 101 acquires a time at which an operator last touched the operation unit 5 (this may also include, for example, a time at which the operator opened or closed a platen cover of the scanner device 2), and a current time from the RTC 102, and determines whether a predetermined time period (an automatic clear shift time period), which is set in advance, has elapsed.

The above-described predetermined time period (the automatic clear shift time period) is set via the operation unit 5, and is stored in the non-volatile memory 105 (this storage destination may be the hard disk device 6 or the flash disk 107).

Then, if the CPU 101 determines that the predetermined time period (the automatic clear shift time period) has elapsed (YES in step S303), the CPU 101 advances the processing to step S304.

On the other hand, if the CPU 101 determines that the predetermined time period (the automatic clear shift time period) has not elapsed yet (NO in step S303), the CPU 101 returns the processing to step S303, and continues monitoring an elapse of the predetermined time period. Steps S304 to S309 are similar to steps S203 to S208 illustrated in FIGS. 2, and therefore a description thereof will be omitted here.

As described above, according to the present exemplary embodiment, even when the shutdown set time has been reached, as long as the predetermined time period has not elapsed from the last operation from the operation unit 5 yet, the image forming apparatus 1 is not shut down. Then, upon an elapse of the predetermined time period, the image forming apparatus 1 operates, treating this moment as arrival of the shutdown set time. In other words, the image forming apparatus 1 is configured so as to perform the operations of steps S304 to S309 after the predetermined time period has elapsed.

As described above, the CPU 101 monitors the elapsed time period from the operator's last operation in step S303, whereby it is possible to prevent occurrence of such a situation that weekly shutdown is performed while the operator is operating the screen or immediately after the operator operates the screen, and the image forming apparatus 1 is automatically turned off.

For example, assume that the current time is 21:00, and the last operation is performed at this time. Assume that the monitoring time period (the automatic clear shift time period) from the last operation is set to 5 minutes. Further, assume that the shutdown set time is set to 21:02. In this case, the image forming apparatus 1 is not shut down at 21:02, but is shut down at 21:05.

A third exemplary embodiment has a function of automatically setting the image forming apparatus 1 to the sleep state at a specified time for each day of the week (an automatic sleep function).

The automatic sleep function is such a function that a user sets a time at which the image forming apparatus 1 automatically shifts to the sleep state for each day of the week, for example, 19 o'clock for Monday, 19 o'clock for Tuesday, and 17 o'clock for Wednesday, and so the image forming apparatus 1 shifts to the sleep state at the automatic sleep set time for each day of the week.

In the following description, an operation for setting an automatic sleep time will be described.

When the user instructs the image forming apparatus 1 to start setting an automatic sleep time from the operation unit 5, the operation unit 5 notifies the CPU 101 of this operation, and the CPU 101 displays a screen for setting an automatic sleep time on the display unit of the operation unit 5.

Then, when the user sets an automatic sleep time from the setting screen, the operation unit 5 notifies the CPU 101 of this operation, and the CPU 101 stores the set automatic sleep time (an automatic sleep set time) in the non-volatile memory 105 (this storage destination may be the hard disk device 6 or the flash disk 107). As the automatic sleep set time, a different time may be set for each day of the week, or a same time may be set for all days of the week.

In the following description, a content of processing according to the third exemplary embodiment will be specifically described with reference to FIG. 4.

Figure 4:
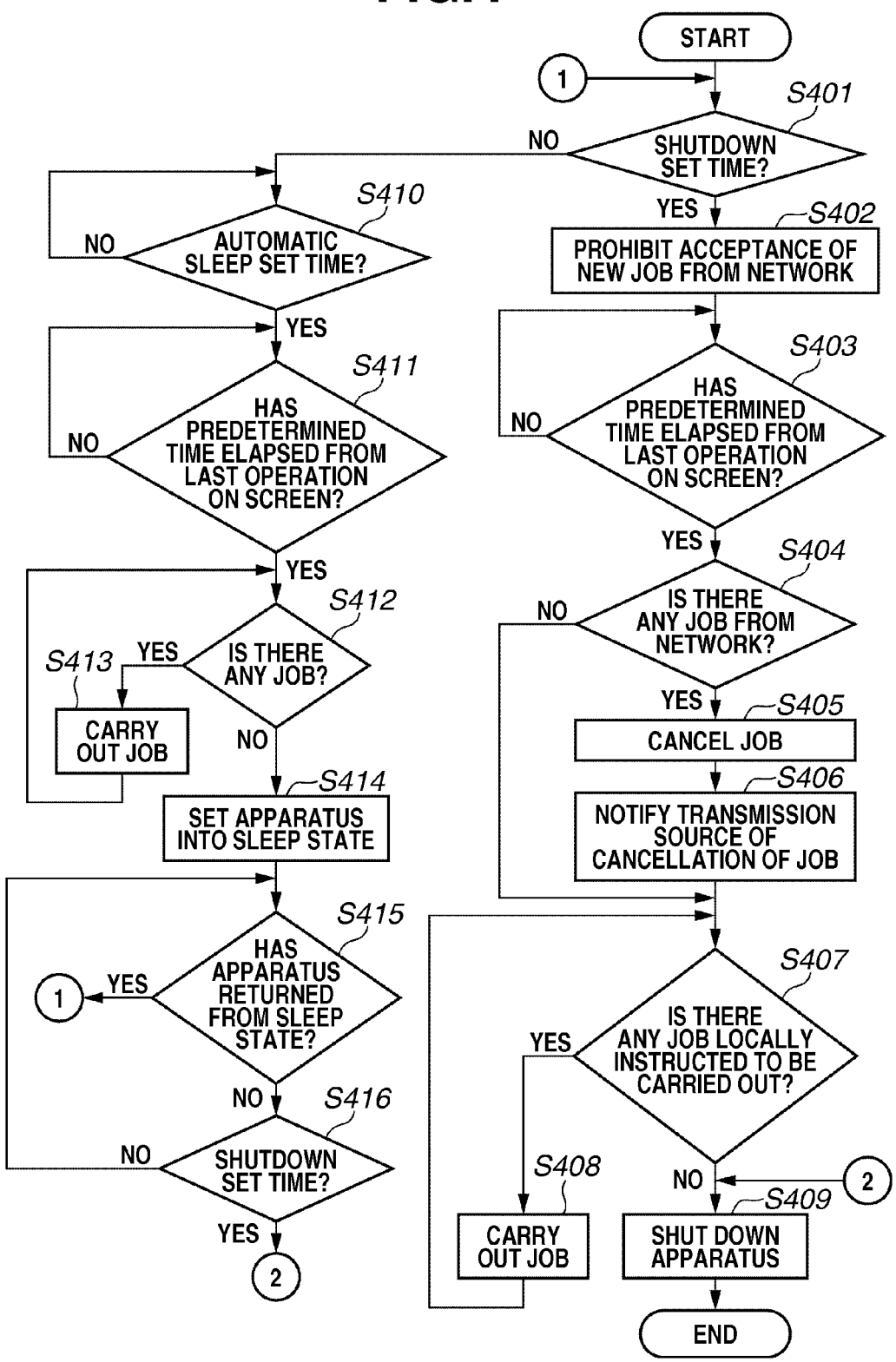
FIG. 4 is a flowchart illustrating an example of a power saving control operation of a controller according to a third exemplary embodiment.

FIG. 4 is a flowchart illustrating an example of a power saving control operation of the controller 10 according to the third exemplary embodiment. The CPU 101 of the controller 10 executes a program stored in the hard disk device 6 or the flash disk 107 in a computer readable manner, by which the present flowchart is realized.

Steps S401 to S409 are similar to steps S301 to S309 illustrated in FIG. 3, and therefore a description thereof will be omitted here.

In step S410, the CPU 101 acquires a current time from the RTC 102, and determines whether a preset automatic sleep set time is reached. This automatic sleep set time is an automatic sleep set time corresponding to today's day of the week, which the CPU 101 acquires from the non-volatile memory 105.

Then, if the CPU 101 determines that the automatic sleep set time is not yet reached (NO in step S410), in step S410, the CPU 101 continues monitoring the automatic sleep set time.

On the other hand, if the CPU 101 determines that the automatic sleep set time has already been reached (YES in step S410), the CPU 101 advances the processing to step S411.

In step S411, the CPU 101 acquires a time at which an operator last touched the operation unit 5 (this may also include, for example, a time at which the operator opened and closed the platen cover of the scanner device 2), and a current time from the RTC 102, and then determines whether the predetermined time period (the automatic clear shift time period), which is set in advance, has elapsed.

Then, if the CPU 101 determines that the predetermined time period (the automatic clear shift time period) has elapsed (YES in step S411), the CPU 101 advances the processing to step S412.

On the other hand, if the CPU 101 determines that the predetermined time period (the automatic clear shift time period) has not elapsed yet (NO in step S411), the CPU 101 returns the processing to step S411, and continues monitoring an elapse of the predetermined time period. In step S412, the CPU 101 determines whether there is a job. The "job" to be determined here may be a job from the network or a job locally instructed to be carried out.

Then, if the CPU 101 determines that there is a job (YES in step S412), the CPU 101 advances the processing to step S413.

In step S413, the CPU 101 carries out the job, and returns the processing to step S412.

On the other hand, if the CPU 101 determines that there is no job (NO in step S412), the CPU 101 advances the processing to step S414.

In step S414, the CPU 101 sets the image forming apparatus 1 to the sleep state. In other words, the CPU 101 turns off the respective units so as to achieve the power supply states illustrated in FIG. 5 with use of the power control unit 109. As a result, the image forming apparatus 1 shifts to the sleep state.

At this time, the shutdown set time is set to the RTC 102 so that an interruption will be issued to the CPU 101 at this time.

Then, for example, when the image forming apparatus 1 receives a job via the network controller 110, an interruption is issued to the CPU 101. If the CPU 101 has returned from the sleep state (YES in step S415), the CPU 101 advances the processing to step S401 again.

If, while the image forming apparatus 1 is in the sleep state (NO in step S415), the shutdown set time is reached and the CPU 101 returns from the sleep state upon reception of an interruption from the RTC 102 (YES in step S416), the CPU 101 advances the processing to step S409, and shuts down the image forming apparatus 1. In other words, the CPU 101 turns off the image forming apparatus 1 with use of the power control unit 109.

The image forming apparatus 1 according to the present exemplary embodiment is configured in such a manner that, even if both automatic sleep and weekly shutdown are set to the image forming apparatus 1, and the shutdown set time is reached while the image forming apparatus 1 is in the power saving state of automatic sleep, the image forming apparatus 1 can be shut down.

Further, the image forming apparatus 1 is configured in such a manner that, even if both automatic sleep and weekly shutdown are set, the image forming apparatus 1 is automatically set to the sleep state upon detection that the automatic sleep set time is reached (while power is supplied to the image forming apparatus 1).

Even when the automatic sleep set time has been reached, if the predetermined time period has not elapsed from a last operation from the operation unit 5 yet, the image forming apparatus 1 is not automatically set to the sleep state. Then, upon an elapse of the predetermined time period, the image forming apparatus 1 operates, treating this moment as arrival of the automatic sleep set time. In other words, the image forming apparatus 1 is configured so as to perform the operations of steps S412 to S414 after the predetermined time period has elapsed.

According to the above-described configuration, the image forming apparatus 1 operates in the following manner, in a case where both automatic sleep and weekly shutdown are set thereto. For example, assume that the current time is 21:00, and the automatic sleep set time and the shutdown set time are set to 21:10 and 21:15, respectively. Further, assume that the monitoring time period from a last operation (the automatic clear sift time period) is set to 5 minutes. In this case, if the operator does not operate the operation unit 5 until 21:10, the image forming apparatus 1 is automatically set to the sleep state at 21:10, and is then shut down at 21:15.

Further, assume that the current time is 21:00, and the automatic sleep set time and the shutdown set time are set to 21:15 and 21:10, respectively. Further, assume that the monitoring time period from a last operation (the automatic clear shift time period) is set to 5 minutes. In this case, if the operator does not operate the operation unit 5 until 21:10, the image forming apparatus 1 is shut down at 21:10, and the automatic sleep function is not performed.

In this way, according to the respective exemplary embodiments of the present invention, it is possible to safely turn off the image forming apparatus 1 even if the operator is operating the image forming apparatus 1 at the shutdown set time. Further, it is also possible to prevent occurrence of such a situation that the image forming apparatus 1 cannot be turned off despite being largely past the shutdown set time.

The above-described exemplary embodiments have been described based on a configuration in which the image forming apparatus is automatically turned at the shutdown set time. However, the above-described exemplary embodiments may be configured so as to automatically turn off the image forming apparatus 1 upon satisfaction with a condition for performing shutdown (a shutdown execution condition).

For example, the above-described exemplary embodiments may be configured so as to automatically turn off the image forming apparatus 1 if the operation unit 5 is not operated for a predetermined time period (for example, 20 minutes). According to this configuration, the user sets a predetermined time period (for example, 20 minutes; hereinafter referred to as an "automatic shutdown time period") from the operation unit 5 in advance.

When the user instructs the image forming apparatus 1 to start setting an automatic shutdown time period from the operation unit 5, the operation unit 5 notifies the CPU 101 of this operation, and the CPU 101 displays a screen for setting an automatic shutdown time period on the display unit of the operation unit 5.

Then, when the user sets an automatic shutdown time period from the setting screen, the operation unit 5 notifies the CPU 101 of this operation, and the CPU 101 stores the set automatic shutdown time period into the non-volatile memory 105 (this storage destination may be the hard disk device 6 or the flash disk 107).

As the automatic shutdown time period, a different time period may be set for each day of the week, or a same time period may be set for all days of the week.

According to this configuration, step S201 illustrated in FIG. 2, step S301 illustrated in FIG. 3, and step S401 illustrated in FIG. 4 are changed to the following operation. In the following description, what kind of change is made will be described based on step S201 illustrated in FIG. 2. However, step S301 illustrated in FIG. 3 and step S401 illustrated in FIG. 4 are also changed in a similar manner.

First, in step S201, the CPU 101 acquires a time at which an operator last touched the operation unit 5 (this may also include, for example, a time at which the operator opened and closed the platen cover of the scanner device 2), and a current time from the RTC 102, and so determines whether the preset automatic shutdown time period has elapsed.

Then, if the CPU 101 determines that the automatic shutdown time period has not elapsed yet (NO in step S201), the CPU 101 returns the processing to step S201, and continues monitoring an elapse of the automatic shutdown time period.

On the other hand, if the CPU 101 determines that the automatic shutdown time period has elapsed (YES in step S201), the CPU 101 advances the processing to step S202.

Determination processing in step S416 illustrated in FIG. 4 is also performed in a similar manner. More specifically, for example, assume that the current time is 21:00, and the automatic shutdown time period is set to 20 minutes. In this case, if the operator does not operate the operation unit 5 until 21:20, the image forming apparatus 1 is shut down at 21:20.

In this way, according to this exemplary embodiment, the image forming apparatus 1 allows the operator to set a condition for performing shutdown to turn off the image forming apparatus 1. When the set condition is satisfied, if there is a job received via the network, the image forming apparatus 1 cancels the job, and then performs shutdown. If there is a job received via an operation from the operation unit 5, the image forming apparatus 1 carries out the job, and then performs shutdown. As a result, it is possible to safely turn off the image forming apparatus 1 if the operator does not operate the operation unit 5 before the automatic shutdown time period has elapsed. Further, it is also possible to prevent occurrence of such a situation that the image forming apparatus 1 cannot be turned off despite being largely past the automatic shutdown time period.

Having described an image forming apparatus as an example of the information processing apparatus according to the present invention, the information processing apparatus according to the present invention is not limited to the image forming apparatus, and may be another type of information processing apparatus. Further, configurations and contents of various kinds of data are not limited to the above-described ones, and the data may be constituted by any of various configurations and contents according to an intended use and purpose.

Having described specific exemplary embodiments, the present invention can be embodied by an embodiment as, for example, a system, an apparatus, a method, a program, or a storage medium. More specifically, the present invention may be applied to a system constituted by a plurality of apparatuses, and may be applied to an apparatus constituted by a single device.

Further, any combination of the above-described exemplary embodiments is included in the scope of the present invention.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-022837 filed Feb. 6, 2012, which is hereby incorporated by reference herein in its entirety.

What is claimed is:

1. An image forming apparatus comprising:
a scanner;
a printer;
a network controller configured to receive, from an external device via a network, a network print job for causing the printer to print information contained in the network print job;
an operation unit configured to receive, from a user, an instruction for executing a local print job for causing the printer to print information read by the scanner;
at least one memory configured to store the network print job, the local print job, and information indicating a shutdown time at which the image forming apparatus is to be turned off; and
at least one processor configured to determine, based on whether each of print jobs stored before the indicated shutdown time but not yet printed is the local print job, whether to print each of the print jobs, and to turn the image forming apparatus off based on the indicated shutdown time,
wherein the processor causes the printer to complete, before turning the image forming apparatus off based on the indicated shutdown time, printing on a sheet each print job which has been determined to be the local print job among the print jobs which have been stored before the indicated shutdown time but which have not been started for printing on a sheet yet at the indicated shutdown time, and
wherein the processor prevents the printer from printing on a sheet, before turning the image forming apparatus off based on the indicated shutdown time, at least one print job that is the network print job among the print jobs which have been stored before the indicated shutdown time but which have not been started for printing on a sheet yet at the indicated shutdown time.

2. The image forming apparatus according to claim 1, wherein the processor causes the printer to turn off when a predetermined time period has elapsed after the printer completes printing on a sheet all local print jobs stored before the indicated shutdown time.

3. The image forming apparatus according to claim 1, wherein, in a case where the network print job is canceled, the network controller is configured to notify a transmission source of the network print job that the network print job is canceled.

4. The image forming apparatus according to claim 1, wherein, after the shutdown time indicated by the information stored in the memory comes, the processor controls the network controller so as not to receive a new network print job.

5. A method for controlling an image forming apparatus which includes a scanner, a printer, a network controller, and a processor in communication with at least one memory, the method comprising:

controlling the network controller to receive, from an external device via a network, a network print job for causing the printer to print information contained in the network print job;

controlling an input unit to receive, from a user, an instruction for executing a local print job for causing the printer to print information read by the scanner;

storing, in the at least one memory, the network print job, the local print job, and information indicating a shutdown time at which the image forming apparatus is to be turned off;

determining using the processor, based on whether each of print jobs stored before the indicated shutdown time but not yet printed is the local print job, whether to print each of the print jobs, and turning the image forming apparatus off based on the indicated shutdown time;

wherein the processor causes the printer to complete, before turning the image forming apparatus off based on the indicated shutdown time, printing on a sheet each print job which has been determined to be the local print job among the print jobs which have been stored before the indicated shutdown time but which have not been started for printing on a sheet yet at the indicated shutdown time, and wherein the processor prevents the printer from printing on a sheet, before turning the image forming apparatus off based on the indicated shutdown time, at least one print job that is the network print job among the print jobs which have been stored before the indicated shutdown time but which have not been started for printing on a sheet yet at the indicated shutdown time.

6. The method according to claim 5, wherein the processor causes the image forming apparatus to turn-off when a predetermined time period has elapsed after all local print jobs have been executed.

7. The method according to claim 5, further comprising notifying, in a case where the network print job is canceled, a transmission source of the network print job that the network print job is canceled.

8. The method according to claim 5, further comprising:
after the shutdown time indicated by the information stored in the memory comes, controlling the network controller to not receive a new network print job.

9. The image forming apparatus according to claim 1, wherein the operation unit is configured to receive a user operation, and
wherein the processor turns off the image forming apparatus after a predetermined time elapses without the operation unit receiving the user operation.

10. The image forming apparatus according to claim 1, wherein the processor is further configured to, according to the coming of the shutdown time, turn off the image forming apparatus after executing a last local print job among the print jobs stored, without executing the network print jobs.

11. The image forming apparatus according to claim 1, wherein the processor is further configured to determine whether a last local print job among the stored print jobs has been executed, and to turn off the image forming apparatus if it is determined that the last local print job has been executed.

12. The method according to claim 5, wherein the processor causes the image forming apparatus to turn-off after executing a last local print job among the print jobs stored, without executing the network print jobs received before the turn-off.

13. The method according to claim 5, further comprising determining whether a last local print job of the print jobs stored has been executed,
wherein the processor causes the image forming apparatus to turn-off if it is determined that the last local print job has been executed.

14. A printing apparatus which shifts into an off state according to a satisfaction of a shift condition for the printing apparatus to shift into the off state, the printing apparatus comprising:
a scanner;
a printer;
a network controller configured to receive, from an external device via a network, a network print job that causes the printer to print information included in the network print job;
a user interface configured to receive, from a user, an instruction to execute a local print job that causes the printer to print information read by the scanner;
at least one memory configured to store the network print job, the local print job, and information indicating the shift condition for the printing apparatus to shift into the off state; and
a processor configured to cause, if the shift condition is satisfied, the printing apparatus to shift into the off state, based on whether each print job which is stored before the shift condition is satisfied and which has not been started for printing on a sheet yet when the shift condition is satisfied is the local print job,
wherein the processor causes the printer to complete, before the printing apparatus shifts into the off state according to a satisfaction of a shift condition, printing on a sheet each print job which is the local print job among the stored print jobs which have been stored before the shift condition is satisfied and which have not been started for printing on a sheet yet when the shift condition is satisfied, and
wherein the processor cancels, before causing the printing apparatus to shift into the off state according to the satisfaction of the shift condition, printing on a sheet at least one print job which is the network print job and is stored before the shift condition is satisfied and which have not been started for printing on a sheet yet when the shift condition is satisfied.

15. The printing apparatus according to claim 14, wherein the processor is further configured to cause, according to the satisfaction of the shift condition, the printing apparatus to shift into the off state after executing a last local print job among the stored print jobs, without executing the network print jobs.

16. The printing apparatus according to claim 14, wherein the processor is further configured to determine whether a last local print job among the stored print jobs has been executed, and to cause the printing apparatus to shift into the off state if it is determined that the last local print job has been executed.

17. The printing apparatus according to claim 14, wherein the stored print jobs include at least one network print job received by the network controller, and
wherein the processor is configured to cause, according to the satisfaction of the shift condition, the printing apparatus to shift into the off state without executing the at least one network print job.

18. The printing apparatus according to claim 14, wherein the off state is a state where power is not supplied to the scanner, the printer, the network controller, the user interface, or the processor.

19. The printing apparatus according to claim 14,
wherein the shift condition is a shutdown time at which the printing apparatus is to be turned off,
wherein the processor is further configured to set the shutdown time input via the user interface, and
wherein the shift condition is satisfied when the set shutdown time comes.

20. The printing apparatus according to claim 14, wherein, according to the satisfaction of the shift condition, the processor causes the printing apparatus to shift into the off sate after completing a print process of printing on a sheet all local print jobs and after a cancelling process of cancelling one or more of the network print jobs stored in the memory.

21. The printing apparatus according to claim 14, wherein, according to the satisfaction of the shift condition, the processor does not start a print process of the network print jobs after the shift condition is satisfied.

22. The printing apparatus according to claim 21, wherein the processor is further configured to cancel, according to the satisfaction of the shift condition, the network print jobs before the shift into the off state.

23. The printing apparatus according to claim 14, wherein the processor is further configured to cause, according to the satisfaction of the shift condition, the printing apparatus to shift into the off state, after executing all local print jobs and after a predetermined period when the user interface does not receive any user's operation elapses.

24. The printing apparatus according to claim 14,
wherein the printing apparatus further shifts into a sleep state where power consumption is higher than the off state, according to a satisfaction of another shift condition for the printing apparatus to shift into the sleep state, and
wherein the processor is further configured to cause, according to the satisfaction of the another shift condition, the printing apparatus to shift into the sleep state after printing on a sheet all local print jobs and all network print jobs that are not yet completed when the another shift condition is satisfied.

25. The printing apparatus according to claim 24,
wherein the sleep state is a state where power is supplied to the network controller and is not supplied to the scanner, the printer, the user interface, or the processor.

26. A printing apparatus which is automatically turned off at a set time, the printing apparatus comprising:
a scanner for reading information on a medium;
a printer for printing information on a sheet;
a network controller configured to receive information from an external device via a network; and
at least one processor configured to accept a plurality of print jobs including at least one local print job that causes the printer to print information read by the scanner and at least one network print job that causes the printer to print information received by the network controller from the external device, and to turn the printing apparatus off based on the set time,
wherein, before turning the printing apparatus off based on the set time, the at least one processor:
identifies the local print job among the accepted print jobs, and
completes printing on sheets all print jobs identified as the local print job among print jobs which are accepted before the set time but which have not been started for printing on a sheet yet at the set time, and cancels printing on a sheet the at least one network print job which is not identified as the local print job among the print jobs which are accepted before the set time but which have not been started for printing on a sheet yet at the set time.

\* \* \* \* \*